US007327255B2

(12) United States Patent
Kassiedass

(10) Patent No.: US 7,327,255 B2
(45) Date of Patent: Feb. 5, 2008

(54) CARRYING CASE FOR A HANDHELD DEVICE AND METHODS THEREOF

(75) Inventor: Sanathan Kassiedass, Toronto (CA)

(73) Assignee: Research In Motion Limited, Waterloo, ON (CA)

( * ) Notice: Subject to any disclaimer, the term of this patent is extended or adjusted under 35 U.S.C. 154(b) by 178 days.

(21) Appl. No.: 11/175,367

(22) Filed: Jul. 7, 2005

(65) Prior Publication Data

US 2007/0008118 A1 Jan. 11, 2007

(51) Int. Cl.
G08B 13/14 (2006.01)
(52) U.S. Cl. .............................. 340/568.1; 340/539.11; 340/539.23; 340/571; 340/572.1; 340/309.8
(58) Field of Classification Search ........... 340/539.21, 340/539.23, 568.1, 571, 572.1, 309.7, 309.8; 455/553.1
See application file for complete search history.

(56) References Cited

U.S. PATENT DOCUMENTS

| 5,635,959 | A | | 6/1997 | Takeuchi et al. | |
|---|---|---|---|---|---|
| 5,757,271 | A | | 5/1998 | Andrews | |
| 5,943,628 | A | * | 8/1999 | Barrett et al. | 455/574 |
| 6,133,830 | A | | 10/2000 | D'Angelo et al. | |
| 6,154,665 | A | * | 11/2000 | Briffett et al. | 455/574 |
| 6,674,358 | B1 | * | 1/2004 | Tinsley | 340/7.63 |
| 6,956,480 | B2 | * | 10/2005 | Jespersen | 340/568.1 |
| 7,019,622 | B2 | * | 3/2006 | Orr et al. | 340/407.1 |
| 7,079,862 | B2 | * | 7/2006 | Chien | 455/553.1 |
| 2003/0043037 | A1 | * | 3/2003 | Lay | 340/568.1 |
| 2004/0070499 | A1 | | 4/2004 | Sawinksi | |
| 2004/0085209 | A1 | | 5/2004 | Schmidt et al. | |
| 2004/0090773 | A1 | * | 5/2004 | Bryan | 362/156 |
| 2006/0022822 | A1 | * | 2/2006 | Wong et al. | 340/568.1 |

OTHER PUBLICATIONS

"Freedom Keepsake" product review (publication date: Apr. 2005). Found on http://www.1src.com/scripts/show/979-Freedom_Keepsafe_Review.html.

* cited by examiner

Primary Examiner—Jeffery Hofsass
Assistant Examiner—Anne V. Lai
(74) Attorney, Agent, or Firm—Integral Intellectual Property Inc.; Miriam Paton

(57) ABSTRACT

A user of a handheld device may be alerted to a possible risk of losing the handheld device. The handheld device is able to be secured to a carrying case. The carrying case may alert the user by activating one or more of its user interface elements. The handheld device may determine that a trigger condition has been met and transmit a signal indicating this to the carrying case. The carrying case may itself determine that a trigger condition has been met. The handheld device may determine that a trigger condition has been met and may alert the user by activating one or more of its user interface elements. The handheld device and the carrying case may communicate via a wireless communication link according to a communication protocol, for example, a Bluetooth® standard, an RFID (Radio Frequency Identification) standard, a Zigbee™ standard or an ultra wideband (UWB) standard.

20 Claims, 5 Drawing Sheets

CARRYING CASE FOR A HANDHELD DEVICE AND METHODS THEREOF

COPYRIGHT NOTICE

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

BACKGROUND OF THE INVENTION

Small wireless communication devices, for example cellular phones, smartphones, pagers, push-to-talk devices, and the like, are becoming increasingly common. They may store private and business contact details, important data, passwords, banking information, photographs, appointments, schedules and deadlines, etc. Some of the possible implications and complications that may result from the loss of such a device include identity theft, the loss of corporate secrets, and the expense of buying a replacement.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

Figure 1:
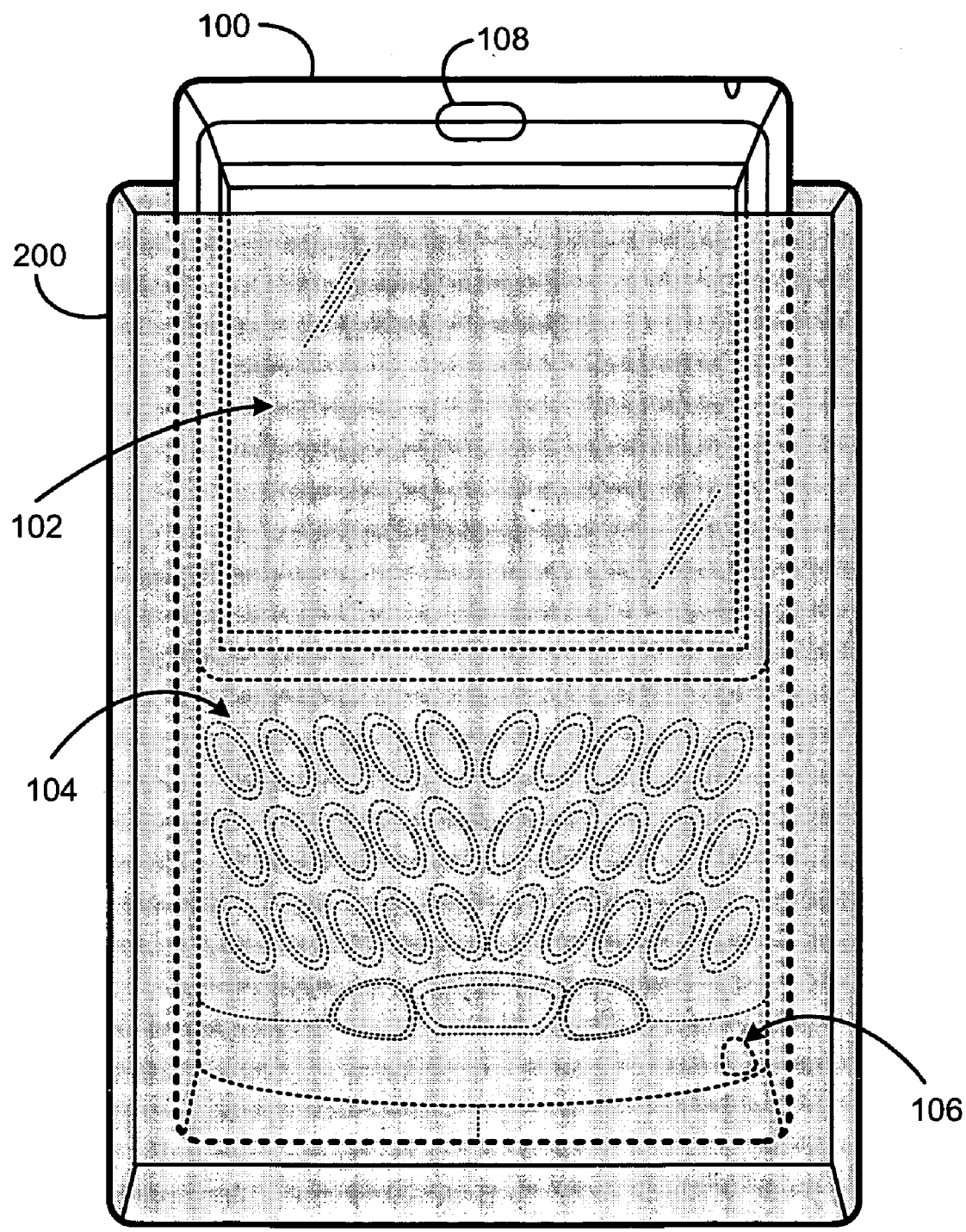
FIG. 1 is a simplified illustration of an exemplary wireless communication device and an exemplary carrying case for that wireless communication device, according to some embodiments of the invention.

FIG. 1 is a simplified illustration of an exemplary handheld device 100 and an exemplary carrying case 200 for handheld device 100, according to some embodiments of the invention. The mechanical features of device 100 and carrying case 200, as shown in FIG. 1, are exemplary, and handheld devices and carrying cases having different mechanical features are also contemplated. For example, device 100 is shown inserted into carrying case 200; however, other means for securing a handheld device and a carrying case are also contemplated.

In this example, device 100 includes a display 102 and a keyboard 104. Keyboard 104 may be embedded in full or in part within display 102, i.e. display 102 may be a "touch screen". In this example, device 100 also includes an audio input element 106, for example a microphone, and an audio output element 108, for example a speaker. However, embodiments of this invention are equally applicable to handheld devices not having one or more of a display, a keyboard, an audio input element and an audio output element. Device 100 may include other user interface elements that are not shown for clarity.

A user may secure carrying case 200 to a personal item worn on the body, for example a belt or other clothing item, or may store carrying case 200 inside a personal item carried by the user, for example a bag, knapsack or purse. A user may secure device 100 to carrying case 200 and may remove device 100 from carrying case 200 from time to time in order to operate device 100 or for any other reason. The user might forget to secure device 100 to carrying case 200 afterward, and as a result, it-is possible that the user might lose device 100, for example, by leaving it behind when the user moves to another place.

According to some embodiments of the invention, if one or more conditions are met, carrying case 200 and/or device 100 may be triggered to alert the user of a possible risk of losing device 100. The one or more conditions may be predefined or programmable. Carrying case 200 may alert the user by activating one or more user interface elements included in carrying case 200. Similarly, device 100 may alert the user by activating one or more user interface elements included in device 100. A non-exhaustive list of examples for such user interface elements includes a vibrator, a sound source, a light source, and any other suitable user interface element.

The following is a non-exhaustive list of examples for conditions that may trigger carrying case 200 and/or device 100 to alert the user.

(1) Handheld device 100 is not secured to carrying case 200, and its distance from carrying case 200 is more than a predefined or programmable distance. As shown hereinbelow, handheld device 100 and carrying case 200 may include means to communicate with one another. A communication link may be established between handheld device 100 and carrying case 200, for example, immediately after handheld device 100 is removed from carrying case 100.

According to some exemplary embodiments of the invention, if handheld device 100 becomes out of range of carrying case 200, carrying case 200 may be triggered to alert the user. According to some other exemplary embodiments of the invention, carrying case 200 may be able to measure the strength of signals originating from handheld 100 and to determine according to those measurements whether to alert the user or not.

According to some other exemplary embodiments of the invention, handheld device 100 may be able to measure the strength of signals originating from carrying case 200 and to determine according to those measurements whether to alert the user or not. If handheld device 100 concludes the user should be alerted, handheld device 100 may be triggered to alert the user and/or may trigger carrying case 200 to alert the user by transmitting an appropriate signal to carrying case 200 over a wireless communication link. One exemplary measurement that can be used in handheld device 100 and/or carrying case 200 for measuring the strength of signals is known as RSSI (Received Signal Strength Indication).

(2) Handheld device 100 is not secured to carrying case 200 and at least a predefined or programmable amount of time has passed since handheld device 100 was last removed from carrying case 200. According to some exemplary embodiments of the invention, carrying case 200 may include a timer implemented in hardware, software or a combination thereof. The timer may count time from the moment handheld device 100 is removed from carrying case 200 and may trigger carrying case 200 to alert the user if a predefined or programmable amount of time has passed. Carrying case 200 may reset the timer once handheld device 100 is returned to carrying case 200.

According to some other exemplary embodiments of the invention, handheld device 100 may include a timer implemented in hardware, software or a combination thereof. The timer may count time from the moment handheld device 100 is removed from carrying case 200, and if a predefined or programmable amount of time has passed, handheld device 100 may be triggered to alert the user and/or may trigger carrying case 200 to alert the user by transmitting an appropriate signal to carrying case 200 over a wireless communication link. Handheld device 100 may reset the timer once handheld device 100 is returned to carrying case 200.

(3) Handheld device 100 is not secured to carrying case 200 and at least a predefined or programmable amount of time has passed since handheld device 100 was last removed from carrying case 200 without the user activating handheld device 100. According to some exemplary embodiments of the invention, handheld device 100 may include a timer implemented in hardware, software or a combination thereof. The timer may count time from the moment handheld device 100 is removed from carrying case 200 and may terminate the counting if the user activates handheld device 100. Handheld device 100 may stop and/or reset the timer once the user activates handheld device 100 or returns handheld device 100 to carrying case 200.

For example, the user may activate handheld device 100 by pressing a key of keyboard 104, by activating any other electromechanical switch included in handheld device 100, or by actively participating in a communication session involving handheld device 100. If a predefined or programmable amount of time passes without a user activating handheld device 100, handheld device 100 may be triggered to alert the user and/or may trigger carrying case 200 to alert the user by transmitting an appropriate signal to carrying case 200.

(4) Handheld device 100 is not secured to carrying case 200 and at least a predefined or programmable amount of time has passed since the last activation of handheld device 100 without the user re-activating handheld device 100. According to some exemplary embodiments of the invention, handheld device 100 may include a timer implemented in hardware, software or a combination thereof. The timer may start (or re-start) counting time at activations of handheld device 100. A non-exhaustive list of examples for activation of handheld device 100 includes termination of a communication session involving handheld device 100, activation of a key or another electromechanical element included in handheld device 100, and any other suitable activation of handheld device 100.

The counting may be terminated and re-started if another activation of handheld device 100 occurs. If a predefined or programmable amount of time has passed since the most recent activation of handheld device 100, handheld device 100 may be triggered to alert the user and/or may trigger carrying case 200 to alert the user by transmitting an appropriate signal to carrying case 200.

Figure 2:
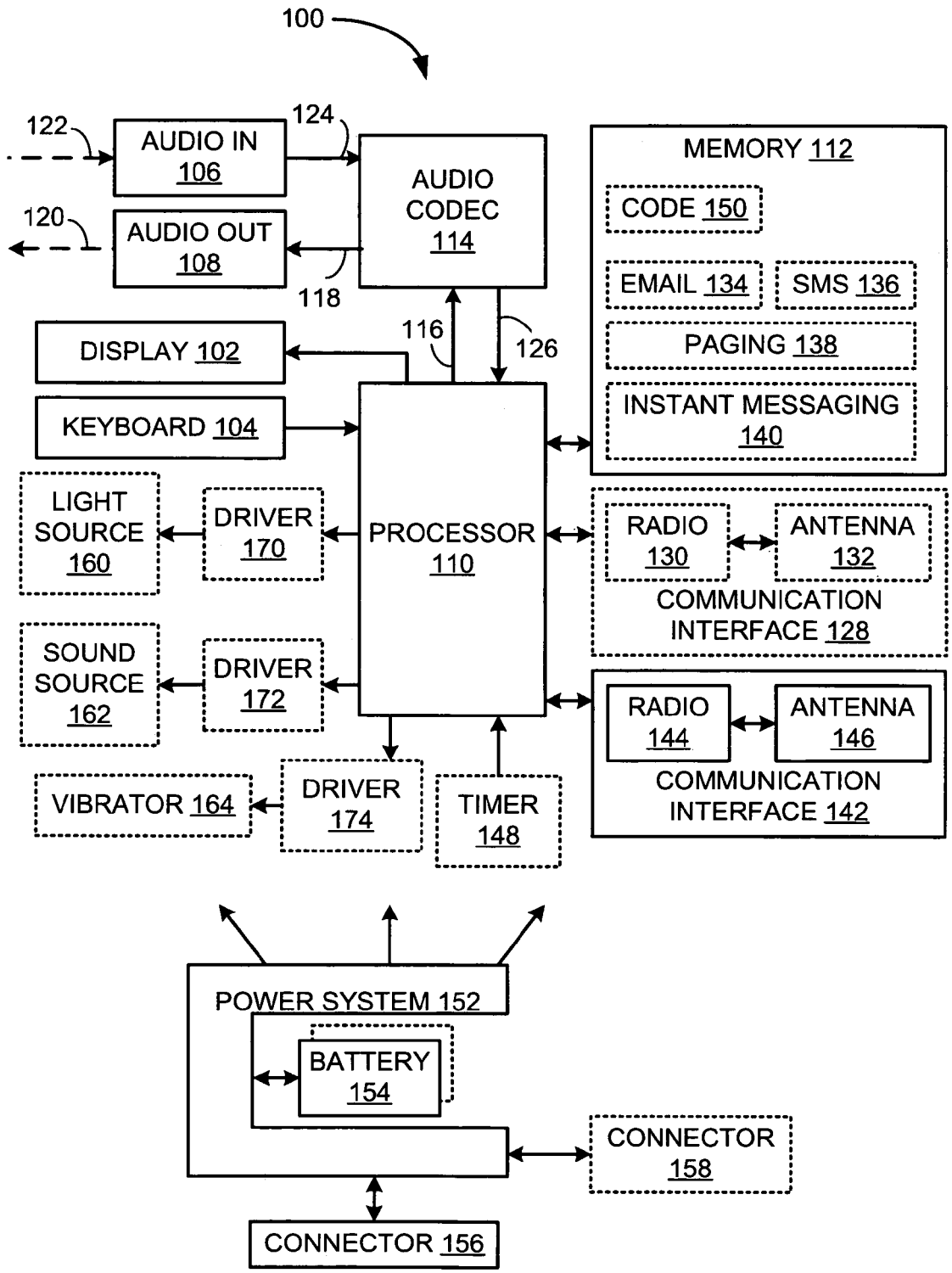
FIG. 2 is a simplified block diagram of an exemplary handheld device, according to some embodiments of the invention.

FIG. 2 is a simplified block diagram of exemplary handheld device 100, according to some embodiments of the invention. Handheld device 100 includes a processor 110 and a memory 112. Memory 112, keyboard 104 and display 102 are coupled to processor 110. Handheld device 100 includes an audio coder-decoder (codec) 114 coupled to audio input element 106, audio output element 108 and processor 110.

Codec 114 may be able to receive a digital representation 116 of sound waves from processor 110 and to output a corresponding analog signal 118 to audio output device 108. Audio output device 108 may be able to receive analog signal 118 and to output sound waves 120 corresponding to analog signal 118. In addition, audio input element 106 may be able to receive sound waves 122 and to output a corresponding analog signal 124 to codec 114. Codec 114 may be able to receive analog signal 124 and to output a digital representation 126 of analog signal 124 to processor 110.

Handheld device 100 may optionally include a wireless communication interface 128, compatible with a wireless communication protocol, coupled to processor 110 and including at least a radio 130 and an antenna 132. By way of wireless communication interface 128 and a communication infrastructure (not shown) that is external to handheld device 100, handheld device 100 may be able to establish communication sessions with other devices (not shown).

Alternatively, a communication device (not shown) belonging to a different user may initiate a communication session to handheld device 100. Handheld device 100 may receive a notification about the initiated communication session from a communication infrastructure (not shown) that is external to handheld device 100. Handheld device 100 may notify its user about the incoming communication session, and the user may or may not receive the telephone communication session.

A non-exhaustive list of examples for communication sessions includes telephone communication sessions, sending and receiving electronic mail (Email), sending and receiving instant messages, sending and receiving paging messages, sending and receiving short message service (SMS) messages, and any other suitable communication sessions.

For types of communication sessions supported by handheld device 100, memory 112 may store respective software modules to be executed by processor 110, for example, an Email software module 134, an SMS software module 136, a paging software module 138 and an instant messaging software module 140.

Handheld device 100 includes a secondary communication interface 142, compatible with a wireless communication protocol that is different from the wireless communication protocol that communication interface 128 is compatible with. Communication interface 142 may be coupled to processor 110 and may include at least a radio 144 and an antenna 146.

For example, handheld device 100 may be "Bluetooth®-enabled", and communication interface 142 may comply with Bluetooth® core specifications v1.1, published Feb. 22, 2001 by the Bluetooth® special interest group (SIG) and/or with Bluetooth® core specifications v1.2, published Nov. 5, 2003. However, it will be obvious to those of ordinary skill in the art how to modify the following for other existing Bluetooth® standards or future related standards. Alternatively, communication interface 142 may comply with any other suitable protocol, for example Zigbee™, RFID (Radio Frequency Identification), ultra wideband (UWB), or a proprietary communication protocol.

By way of communication interface 142, handheld device 100 may be able to communicate with other devices that comply with the same protocol as communication interface 142. For example, handheld device 100 may communicate with carrying case 200 by way of communication interface 142.

Handheld device 100 may optionally include a timer 148 that is implemented in hardware, software, or a combination thereof. Memory 112 may optionally include code 150 that, when executed by processor 110, determines whether any of the trigger conditions have been met. In addition, code 150 may be able to control timer 148.

Handheld device 100 includes a power system 152, one or more batteries 154, and a connector 156, both coupled to power system 152. Connector 156 can be connected to an external power source (not shown) that can provide power for charging batteries 154 and/or for operating handheld device 100. Power system 152 provides electrical coupling between the external power source and batteries 154, and provides electrical coupling between batteries 154 and the electrical components of handheld device 100 (i.e. processor 110, memory 112, and the like). As part of the electrical coupling between the external power source and battery 154, power system 152 may control the charging of batteries 154 with electrical charge drawn from the external power source.

A non-exhaustive list of examples for batteries 154 includes Ni—Cd (Nickel Cadmium) batteries, Ni-MH (Nickel-Metal Hydride) batteries, Lithium Ion batteries, rechargeable Alkaline batteries, and any other suitable batteries.

Handheld device 100 may optionally include a connector 158 coupled to power system 152 to provide power to carrying case 200, as described hereinbelow.

In addition to display 102, keyboard 104, audio input element 106 and audio output element 108, handheld device 100 may includes one or more additional user interface elements, for example, a light source 160, a sound source 162 and a vibrator 164, and may include respective electrical drivers 170, 172 and 174. Light source 160 may be, for example a LED (Light Emitting Diode) or a lamp. Sound source 162 may be, for example, a speaker or a buzzer. Vibrator 164 may be, for example, an eccentric vibrator motor. By way of drivers 170, 172 and 174, processor 110 may be able to activate light source 160 and/or sound source 162 and/or vibrator 164, respectively, to alert a user if any of the trigger conditions are met. Audio output element 108 may be used instead of sound source 162 to alert the user if any of the trigger conditions are met.

Figure 3:
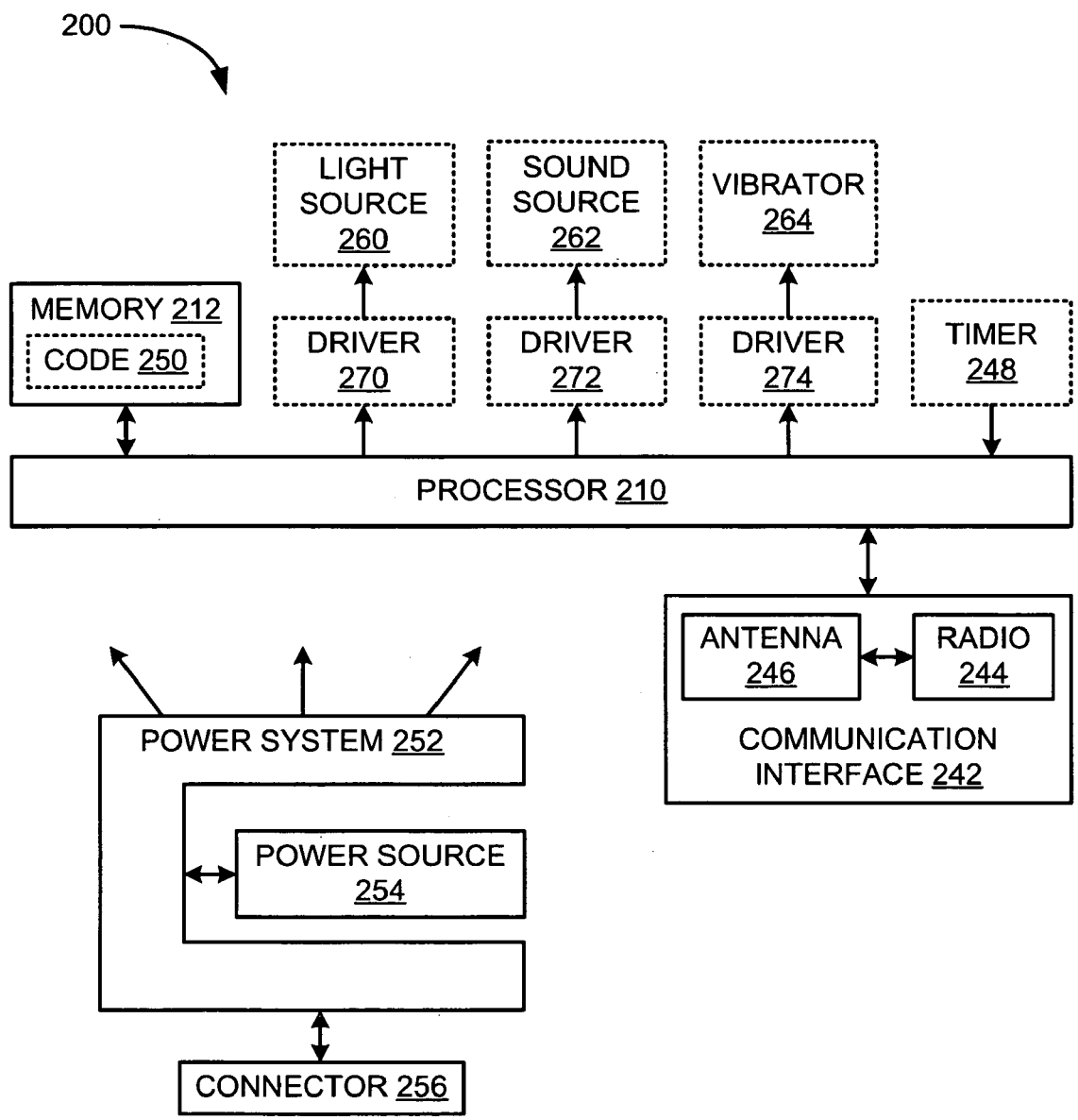
FIG. 3 is a simplified block diagram of an exemplary carrying case for a handheld device, according to some embodiments of the invention.

FIG. 3 is a simplified block diagram of exemplary carrying case 200, according to some embodiments of the invention. Carrying case 200 includes a processor 210 and a memory 212 coupled to processor 210. Carrying case 200 includes a wireless communication interface 242, compatible with the same wireless communication protocol as wireless communication interface 142 of handheld device 100. Wireless communication interface 242 may be coupled to processor 210 and may include at least a radio 244 and an antenna 246. By way of communication interface 242, carrying case 200 may be able to communicate with other devices that comply with the same protocol as communication interface 242. For example, carrying case 200 may communicate with handheld device 100 by way of communication interface 242.

Carrying case 200 includes one or more user interface elements, for example, a light source 260, a sound source 262 and a vibrator 264, and may include respective electrical drivers 270, 272 and 274. Light source 260 may be, for example a LED (Light Emitting Diode) or a lamp. Sound source 262 may be, for example, a speaker or a buzzer. Vibrator 264 may be, for example, an eccentric vibrator motor. By way of drivers 270, 272 and 274, processor 210 may be able to activate light source 260 and/or sound source 262 and/or vibrator 264, respectively, to alert a user if any of the trigger conditions are met.

Carrying case 200 may optionally include a timer 248 that is implemented in hardware, software, or a combination thereof. Memory 212 may optionally include code 250 that, when executed by processor 210, determine whether any of the trigger conditions have been met. In addition, code 150 of handheld device 100 may be able to control timer 250.

Carrying case 200 includes a power system 252, a power source 254, and a connector 256, both coupled to power system 252. Connector 256 can be connected to an external power source, that may be, for example, connector 158 of handheld device 100, that can provide power for charging power source 254.

Power system 252 provides electrical coupling between the external power source and power source 254, and provides electrical coupling between power source 254 and the electrical components of carrying case 200 (i.e. processor 210, memory 212, and the like). As part of the electrical coupling between the external power source and power source 254, power system 252 may control the charging of power source 254 with electrical charge drawn from the external power source.

Figure 4:
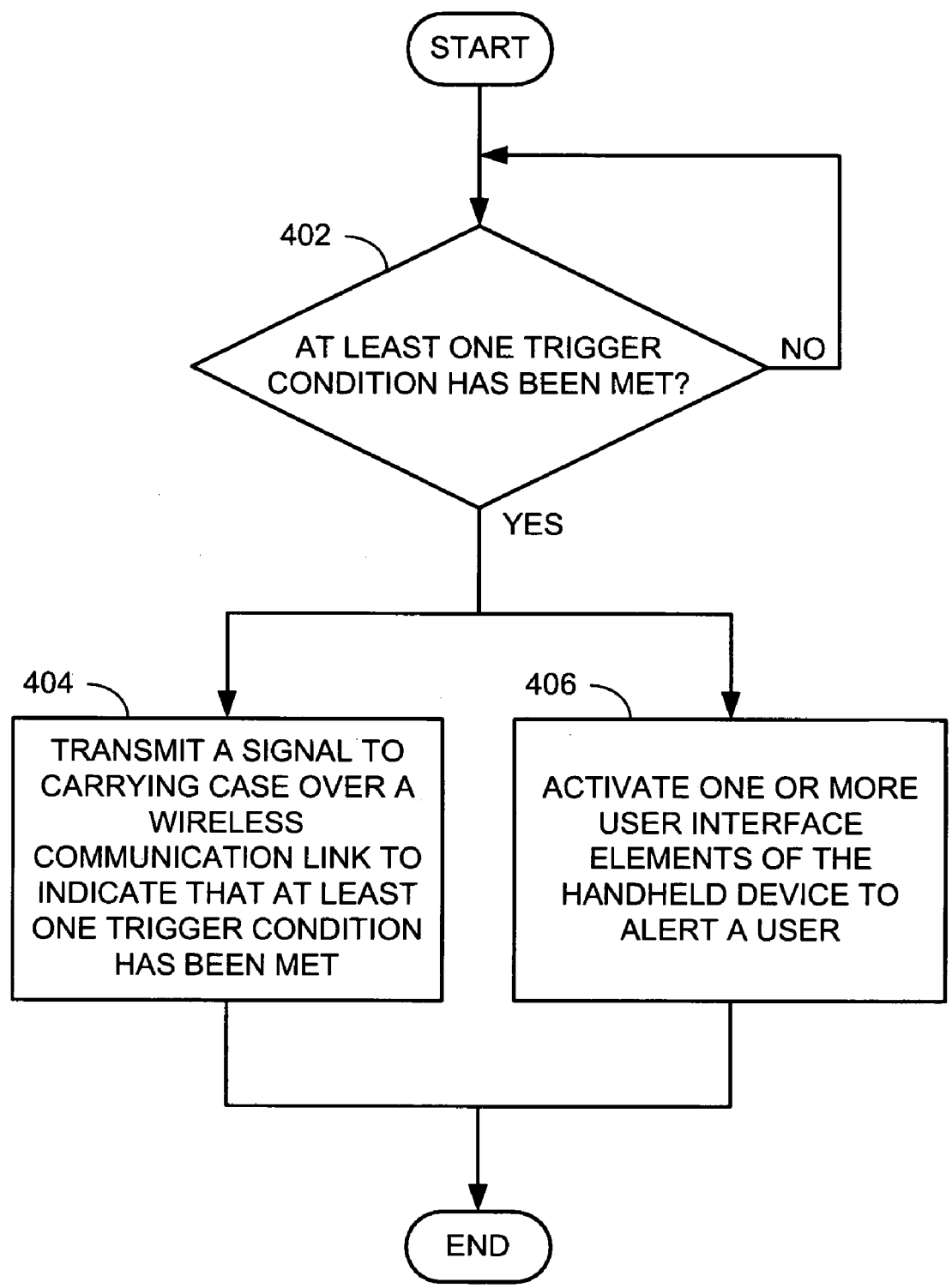
FIG. 4 is a flowchart of an exemplary method in a handheld device for causing a carrying case of the handheld device to alert a user of the handheld device of a possible risk of losing the handheld device, according to an embodiment of the invention.

FIG. 4 is a flowchart of an exemplary method in handheld device 100 for causing carrying case 200 to alert a user of handheld device 100 of a possible risk of losing handheld device 100, according to an embodiment of the invention. Handheld device 100 may check whether at least one trigger condition has been met (402), and if at least one trigger condition has been met, handheld device 100 may transmit a signal to carrying case 200 to indicate that at least one trigger condition has been met (404) and/or may activate one or more user interface elements of handheld device 100 in order to alert the user (406). Various situations in which handheld device 100 may determine that one or more trigger conditions have been met are described hereinabove.

Figure 5:
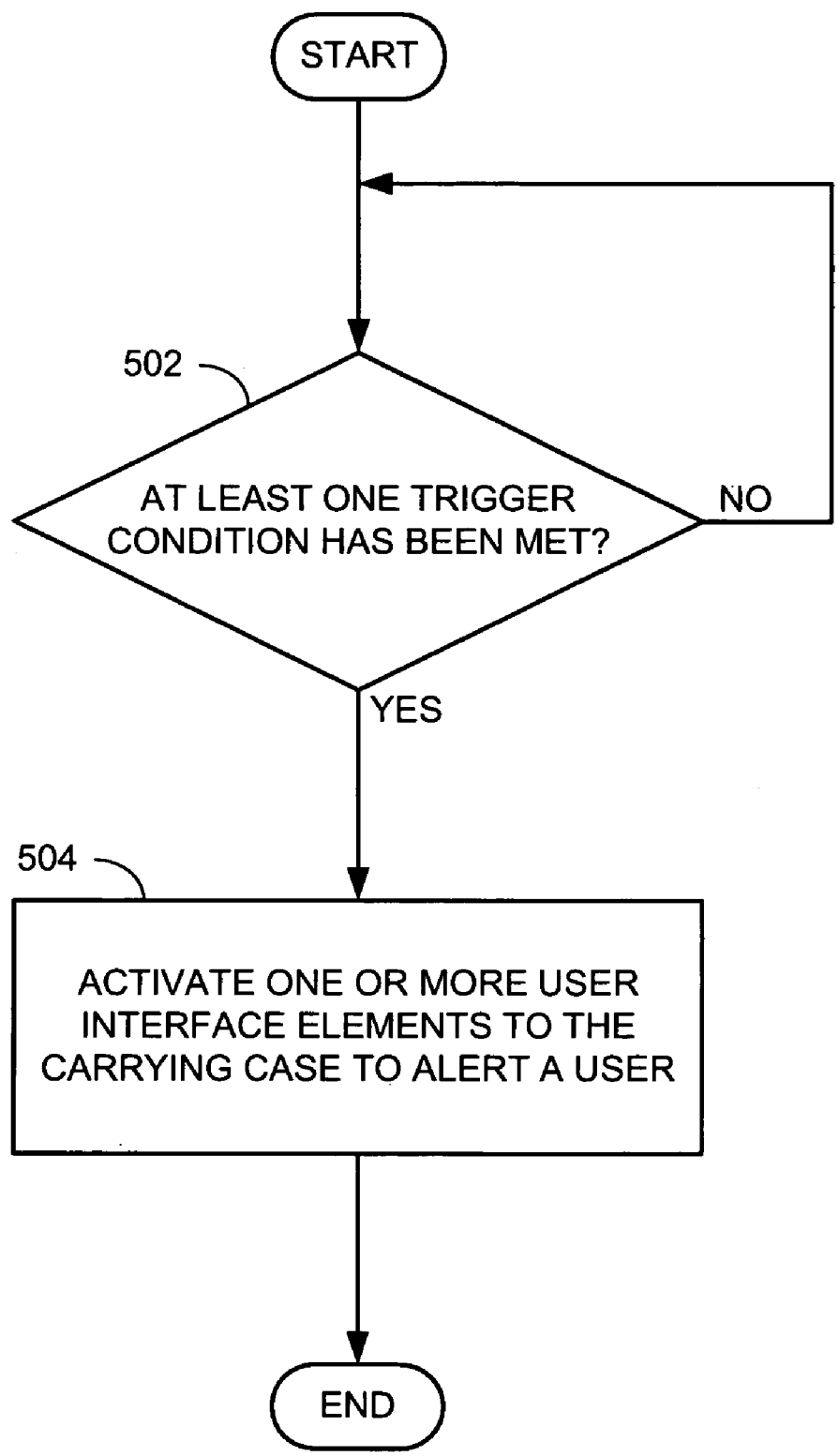
FIG. 5 is a flowchart of an exemplary method in a carrying case for a handheld device for alerting a user of the handheld device of a possible risk of losing the handheld device, according to an embodiment of the invention.

FIG. 5 is a flowchart of an exemplary method in carrying case 200 to alert a user of handheld device 100 of a possible risk of losing handheld device 100, according to an embodiment of the invention. Carrying case 200 may check whether at least one trigger condition has been met (502), and if at least one trigger condition has been met, carrying case 200 may activate one or more user interface elements of carrying case 200 in order to alert the user (504). As explained hereinabove, carrying case 200 may receive a signal from handheld device 100 indicating that a trigger condition has been met. Various situations in which carrying case may determine that one or more trigger conditions have been met are described hereinabove.

A non-exhaustive list of examples for power source 254 includes one or more Ni—Cd batteries, one or more Ni-MH batteries, one or more Lithium Ion batteries, one or more rechargeable Alkaline batteries, one or more capacitors, one or more super-capacitors, and any other suitable power source.

A non-exhaustive list of examples for handheld device 100 includes a cellular phone, a smart phone, a pager, a push-to-talk device, a personal digital assistant (PDA), an MP3 (Moving Picture Experts Group Layer-3 Audio) player, an electronic mail (Email) client, a gaming device, a wireless terminal, and any other suitable small wireless-enabled electronic device.

A non-exhaustive list of examples for standards with which wireless communication interface 128 may comply includes Direct Sequence—Code Division Multiple Access (DS-CDMA) cellular radiotelephone communication, Global System for Mobile Communications (GSM) cellular radiotelephone, North American Digital Cellular (NADC) cellular radiotelephone, Time Division Multiple Access (TDMA), Extended-TDMA (E-TDMA) cellular radiotelephone, wideband CDMA (WCDMA), General Packet Radio Service (GPRS), Enhanced Data for GSM Evolution (EDGE), 3G and 4G communication.

Alternatively, handheld device 100 may be "802.11-enabled", and wireless communication interface 128 may comply with one or more of the following standards defined by the Institute of Electrical and Electronic Engineers (IEEE) for Wireless LAN MAC and Physical layer (PHY) specifications:

| Standard | Published | Maximum Speed | Frequency | Modulation |
|---|---|---|---|---|
| 802.11 | 1997 | 2 Mbps | 2.4 GHz | Phase-Shift |
| 802.11a | 1999 | 54 Mbps | 5.0 GHz | Orthogonal Frequency Division Multiplexing |
| 802.11b | 1999 | 11 Mbps | 2.4 GHz | Complementary Code Keying |
| 802.11g | 2003 | 54 Mbps | 2.4 GHz | Orthogonal Frequency Division Multiplexing |

However, it will be obvious to those of ordinary skill in the art how to modify the following for other existing WLAN standards or future related standards, including 802.11n.

A non-exhaustive list of examples for processors 110 and 210 includes microprocessors, microcontrollers, central processing units (CPU), digital signal processors (DSP), reduced instruction set computers (RISC), complex instruction set computers (CISC) and the like. Furthermore, any of processors 110 and 210 may comprise more than one processing unit, may be part of an application specific integrated circuit (ASIC) or may be a part of an application specific standard product (ASSP).

A non-exhaustive list of examples for memories 112 and 212 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

A non-exhaustive list of examples for antennae 132, 146 and 246 includes dipole antennae, monopole antennae, multilayer ceramic antennae, planar inverted-F antennae, loop antennae, slot antennae, dual antennae, omnidirectional antennae and any other suitable antennae.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method to alert a user of a handheld device and a carrying case for said handheld device of a possible risk of losing said handheld device, the method comprising:

determining at said handheld device that said handheld device is not secured to said carrying case and that at least a predefined or programmable amount of time has passed since said handheld device was last removed from said carrying case; and consequently, transmitting a signal from said handheld device to said carrying case over a wireless communication link to cause said carrying case to activate at least one of its user interface elements in order to alert said user to said risk.

2. The method of claim 1, further comprising:

activating a user interface element of said handheld device in order to alert said user to said risk.

3. A method to alert a user of a handheld device and a carrying case for said handheld device of a possible risk of losing said handheld device, the method comprising:

determining at said handheld device that said handheld device is not secured to said carrying case and that at least a predefined or programmable amount of time has passed since said handheld device was last removed from said carrying case without said handheld device being activated; and consequently, transmitting a signal from said handheld device to said carrying case over a wireless communication link to cause said carrying case to activate at least one of its user interface elements in order to alert said user to said risk.

4. The method of claim 3, wherein determining that at least said predefined or programmable amount of time has passed since said handheld device was last removed from said carrying case without said handheld device being activated includes:

determining that no electro-mechanical switch included in said handheld device has been activated for at least said predefined or programmable amount of time since said handheld device was last removed from said carrying case.

5. The method of claim 3, wherein determining that at least said predefined or programmable amount of time has passed since said handheld device was last removed from said carrying case without said handheld device being activated includes:

determining that said user has not participated in any communication session using said handheld device for at least said predefined or programmable amount of time since said handheld device was last removed from said carrying case.

6. The method of claim 3, further comprising:
activating a user interface element of said handheld device in order to alert said user to said risk.

7. A method to alert a user of a handheld device and a carrying case for said handheld device of a possible risk of losing said handheld device, the method comprising:
determining at said handheld device that said handheld device is not secured to said carrying case and that at least a predefined or programmable amount of time has passed since a last activation of said handheld device; and
consequently, transmitting a signal from said handheld device to said carrying case over a wireless communication link to cause said carrying case to activate at least one of its user interface elements in order to alert said user to said risk.

8. The method of claim 7, further comprising:
activating a user interface element of said handheld device in order to alert said user to said risk.

9. A handheld device comprising:
a wireless communication interface through which said handheld device is able to communicate with a carrying case;
a processor;
a memory; and
a power source to provide power to said processor, said memory and said communication interface,
wherein said memory is to store code that, when executed by said processor, determines, in the event that said handheld device is not secured to said carrying case, whether at least a predefined or programmable amount of time has passed since said handheld device was last removed from said carrying case and if so, controls said wireless communication interface to transmit a signal to said carrying case to cause said carrying case to activate at least one of its user interface elements in order to alert said user to a possible risk of losing said handheld device.

10. The handheld device of claim 9, further comprising a user interface element and wherein said code, when executed by said processor, activates said user interface element of said handheld device to alert said user to said possible risk.

11. The handheld device of claim 9, further comprising:
a connector coupled to said power source to provide power to said carrying case while said handheld device is secured to said carrying case.

12. The handheld device of claim 9, wherein said wireless communication interface is compatible with at least one of a Bluetooth® standard, an RFID (Radio Frequency Identification) standard, a Zigbee™ standard and an ultra wideband (UWB) standard.

13. A handheld device comprising:
a wireless communication interface through which said handheld device is able to communicate with a carrying case;
a processor;
a memory; and
a power source to provide power to said processor, said memory and said communication interface,
wherein said memory is to store code that, when executed by said processor, determines, in the event that said handheld device is not secured to said carrying case, whether at least a predefined or programmable amount of time has passed since said handheld device was last removed from said carrying case without said handheld device being activated and if so, controls said wireless communication interface to transmit a signal to said carrying case to cause said carrying case to activate at least one of its user interface elements in order to alert said user to a possible risk of losing said handheld device.

14. The handheld device of claim 13, further comprising a user interface element and wherein said code, when executed by said processor, activates said user interface element of said handheld device to alert said user to said possible risk.

15. The handheld device of claim 13, further comprising:
a connector coupled to said power source to provide power to said carrying case while said handheld device is secured to said carrying case.

16. The handheld device of claim 13, wherein said wireless communication interface is compatible with at least one of a Bluetooth® standard, an RFID (Radio Frequency Identification) standard, a Zigbee™ standard and an ultra wideband (UWB) standard.

17. A handheld device comprising:
a wireless communication interface through which said handheld device is able to communicate with a carrying case;
a processor;
a memory; and
a power source to provide power to said processor, said memory and said communication interface,
wherein said memory is to store code that, when executed by said processor, determines, in the event that said handheld device is not secured to said carrying case, whether at least a predefined or programmable amount of time has passed since a last activation of said handheld device and if so, controls said wireless communication interface to transmit a signal to said carrying case to cause said carrying case to activate at least one of its user interface elements in order to alert said user to a possible risk of losing said handheld device.

18. The handheld device of claim 17, further comprising a user interface element and wherein said code, when executed by said processor, activates said user interface element of said handheld device to alert said user to said possible risk.

19. The handheld device of claim 17, further comprising:
a connector coupled to said power source to provide power to said carrying case while said handheld device is secured to said carrying case.

20. The handheld device of claim 17, wherein said wireless communication interface is compatible with at least one of a Bluetooth® standard, an RFID (Radio Frequency Identification) standard, a Zigbee™ standard and an ultra wideband (UWB) standard.

* * * * *